United States Patent
Bayley et al.

(10) Patent No.: US 10,425,460 B2
(45) Date of Patent: Sep. 24, 2019

(54) MARKING OBJECTS OF INTEREST IN A STREAMING VIDEO

(71) Applicant: Plantronics, Inc., Santa Cruz, CA (US)

(72) Inventors: Antony M W Bayley, Royal Wootton Bassett (GB); Philip Sherburne, Morgan Hill, CA (US)

(73) Assignee: Plantronics, Inc., Santa Cruz, CA (US)

( * ) Notice: Subject to any disclaimer, the term of this patent is extended or adjusted under 35 U.S.C. 154(b) by 302 days.

(21) Appl. No.: 15/299,160

(22) Filed: Oct. 20, 2016

(65) Prior Publication Data

US 2018/0115591 A1    Apr. 26, 2018

(51) Int. Cl.
*H04L 29/06*    (2006.01)
*H04N 21/4728*    (2011.01)

(52) U.S. Cl.
CPC ........ *H04L 65/605* (2013.01); *H04L 65/1086* (2013.01); *H04L 65/403* (2013.01); *H04N 21/4728* (2013.01)

(58) Field of Classification Search
CPC ............. H04N 21/4725; H04N 21/812; H04N 21/854; H04N 21/8547; H04N 21/858; H04N 21/4307; H04N 5/04; H04N 7/04; H04N 7/015
See application file for complete search history.

(56) References Cited

U.S. PATENT DOCUMENTS

| | | | | |
|---|---|---|---|---|
| 5,875,305 A | * | 2/1999 | Winter | G08B 13/19604 709/231 |
| 6,493,872 B1 | * | 12/2002 | Rangan | H04N 7/083 348/563 |
| 2001/0023436 A1 | * | 9/2001 | Srinivasan | G11B 27/031 709/219 |
| 2004/0254982 A1 | * | 12/2004 | Hoffman | H04L 29/06027 709/204 |
| 2008/0300055 A1 | * | 12/2008 | Lutnick | G07F 17/3209 463/39 |
| 2013/0311595 A1 | * | 11/2013 | Milatinovici | H04N 21/26275 709/214 |
| 2014/0300758 A1 | * | 10/2014 | Tran | H04N 5/225 348/207.1 |
| 2016/0307371 A1 | * | 10/2016 | Ayers | G06T 19/006 |

OTHER PUBLICATIONS

Shi et al., "Good Features to Track," Proceedings of the IEEE Conference on Computer Vision and Pattern Recognition (CVPR); Seattle, WA, USA. Jun. 21-23, 1994, 8 pages.
Lucas et al., "An Iterative Image Registration technique with an Application to Stereo Vision," Proceedings of Imaging Understanding Workshop, pp. 121-130, 1981, 10 pages.
Bouguet, "Pyramidal Implementation of the Affine Lucas Kanade Feature Tracker Descritpion of the Algorithm," Technical Report, Intel Microprocessor Research Labs, 1999, 10 pages.

* cited by examiner

*Primary Examiner* — Edward Kim
(74) *Attorney, Agent, or Firm* — Chuang Intellectual Property Law

(57) ABSTRACT

A video system and method in which a remote viewer can place a marker in a video stream to indicate an object of interest to a local viewer. Transmission delays are accounted for by using optical flow to track the movement of the object of interest so that the marker can be placed into the video stream at an updated location on the display of the local viewer.

19 Claims, 7 Drawing Sheets

MARKING OBJECTS OF INTEREST IN A STREAMING VIDEO

FIELD

The present disclosure relates generally to the field of video collaboration. More particularly, the present disclosure relates to marking objects of interest in a video stream.

BACKGROUND

Collaboration between parties located at a distance from each other has become an essential tool in the modern workplace. Videoconferences for example have become commonplace. One factor that adversely affects such remote collaboration is the delay introduced by the communications channel connecting the parties. Such latencies are not a significant problem in most settings. For example in videoconferencing the delays may be noticeable but do not significantly affect the collaboration, especially where the cameras are not moving.

In other settings the communications channel latency makes collaboration difficult or impossible. One example is video collaboration for remote assistance. For example a field service technician may call back to his office for help diagnosing a machine fault. While discussing the fault, the office-based assistant views a video feed from the technician's mobile phone or body-worn camera. Either the assistant or the technician can place markers, which are superimposed on the video image, to highlight the components being described. This technique works well for static images and low latencies. But if the camera or the scene being viewed is moving, and the latency is high, the marker will likely be viewed in the wrong position.

SUMMARY

According to one aspect of the invention, provided is a first display device comprising a receiver configured to receive, from a video source over a first communications channel having a first communications channel latency, a first copy of a streaming video The video source simultaneously streams a second copy of the video to a second display device over a second communications channel having a second communications channel latency, the second communications channel latency being greater than the first communications channel latency. The first display device may include a processor configured to determine optical flow information for the video based on the first copy of the video; and a monitor configured to render the first copy of the video. The receiver may be further configured to receive, from the second display device over a third communications channel having a third latency, a first marker position vector for a first frame of the video and the processor may be further configured to determine a second marker position vector for a second frame of the video based on the first marker position vector, the optical flow information, the first communications channel latency, the second communications channel latency and the third communications channel latency, wherein the second frame follows the first frame in the video. The processor may then place a marker symbol in the second frame of the first copy of the video according to the second marker position vector prior to the monitor rendering the second frame of the first copy of the video.

The processor may further be configured: to determine a third marker position vector for a third frame of the video based on the first marker position vector, the optical flow information, the first communications channel latency, the second communications channel latency and the third communications channel latency; and to place the marker symbol in the third frame in the first copy of the video according to the third marker position vector.

According to another aspect, provided is a method for a first display device, comprising:

receiving, from a video source over a first communications channel having a first communications channel latency, a first copy of a streaming video, wherein the video source simultaneously streams a second copy of the video to a second display device over a second communications channel having a second communications channel latency, wherein the second communications channel latency is greater than the first communications channel latency;

determining optical flow information for the video based on the first copy of the video; and receiving, from the second display device over a third communications channel having a third latency, a first marker position vector for a first frame of the video;

determining a second marker position vector for a second frame of the video based on the first marker position vector, the optical flow information, the first communications channel latency, the second communications channel latency and the third communications channel latency, wherein the second frame follows the first frame in the video;

rendering the first copy of the video; and placing a marker symbol in the second frame in the first copy of the video according to the second marker position vector prior to rendering the second frame of the first copy of the video.

The method may further comprise determining a third marker position vector for a third frame of the video based on the first marker position vector, the optical flow information, the first communications channel latency, the second communications channel latency and the third communications channel latency; and placing the marker symbol in the third frame in the first copy of the video according to the third marker position vector prior to rendering the third frame of the first copy of the video.

According to yet another aspect, provided is computer-readable media embodying instructions executable by a computer to perform functions comprising:

receiving, from a video source over a first communications channel having a first communications channel latency, a first copy of a streaming video, wherein the video source simultaneously streams a second copy of the video to a second display device over a second communications channel having a second communications channel latency, wherein the second communications channel latency is greater than the first communications channel latency;

determining optical flow information for the video based on the first copy of the video; and receiving, from the second display device over a third communications channel having a third latency, a first marker position vector for a first frame of the video;

determining a second marker position vector for a second frame of the video based on the first marker position vector, the optical flow information, the first communications channel latency, the second communications channel latency and the third communications channel latency, wherein the second frame follows the first frame in the video;

causing rendering of the first copy of the video; and placing a marker symbol in the second frame in the first copy of the video according to the second marker position vector prior to rendering the second frame of the first copy of the video.

The details of one or more implementations are set forth in the accompanying drawings and the description below. Other features will be apparent from the description and drawings, and from the claims.

Figure 1:
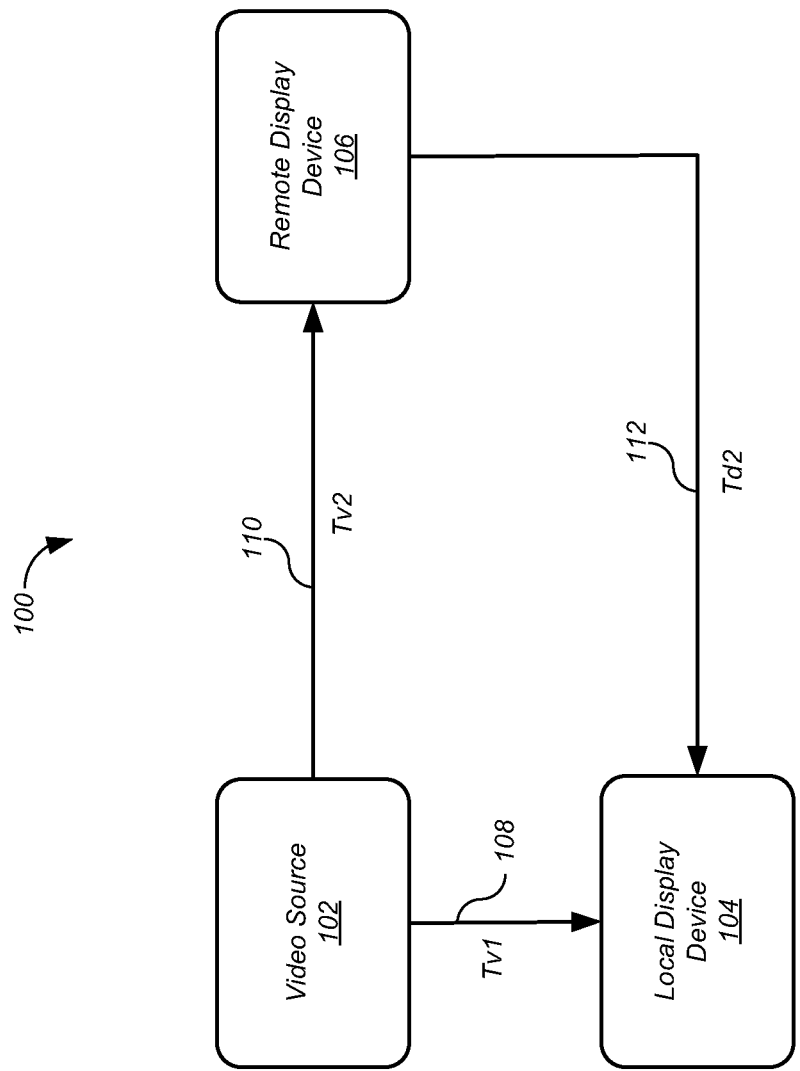
FIG. 1 shows elements of a video collaboration system according to one embodiment.

The leading digit(s) of each reference numeral used in this specification indicates the number of the drawing in which the reference numeral first appears.

DETAILED DESCRIPTION

Embodiments of the present disclosure enable accurate marking of objects of interest in a video stream. Other features are contemplated as well. FIG. 1 shows elements of a video collaboration system 100 according to one embodiment. Although in the described embodiment elements of the video collaboration system 100 are presented in one arrangement, other embodiments may feature other arrangements. For example, elements of the video collaboration system 100 may be implemented in hardware, software, or combinations thereof. As another example, various elements of the video collaboration system 100 may be implemented as one or more digital signal processors.

Referring to FIG. 1, the video collaboration system 100 includes a video source 102, a local display device 104 that is near the video source 102, and a remote display device 106 that is far from the video source 102. The video source 102 may live-stream video (that is, transmit the video in real-time as it is captured), stream a pre-recorded video, or both. The video source 102 generates video and simultaneously streams i) a first copy of the video to the local display device 104 over a first communications channel 108 and ii) a second copy of the video to remote display device 106 over a second communications channel 110. A user of the remote display device 106 may provide user input by marking the second copy of the video. The remote display device 106 may transmit, to the local display device 104, a marker position vector M representing the mark over a third communications channel 112. The communications channels 108, 110, 112 may employ any communication protocol, including wired and wireless communication protocols. The communications channels 108, 110, 112 have respective communications channel latencies Tv1, Tv2, and Td2. Because the video source 102 is farther from the remote display device 106 than the local display device 104, and because of the protocols used to transmit a second copy of the video to the remote display device 106, the latency Tv2 of the communications channel 110 with the remote display device 106 is greater than the latency Tv1 of the communications channel 108 with the local display device 104.

In one embodiment, the video source 102 may for example be a body-worn camera, the local display device 104 may for example be a tablet computer and the remote display device 106 may be a laptop computer, desktop computer, tablet computer or other suitable device. It will be appreciated however that various alternative scenarios are possible. For example, the video source may be a camera built into a tablet computer. In such a case, the video will be transmitted from the built in camera via an internal bus of the tablet computer for rendering on the display of the tablet computer and will also be transmitted via the internal bus and transmitter/receiver of the tablet computer/integrated device 102/104 to the remote display device 106. That is, the video will not be transmitted directly from the camera as such to the remote display device 106 as illustrated in FIG. 1. In such a case, the second communication channel and the third communication channel will share a common path (e.g. wifi to/from the internet) with the second communication channel being outgoing from the integrated device 102/104 to the remote display device 106 and the third communication channel being an incoming channel. That is, as used herein, "communication channel" is used to illustrate the delays found in different transmissions and does not require the use of different protocols or different infrastructure from another communication channel.

Figure 2:
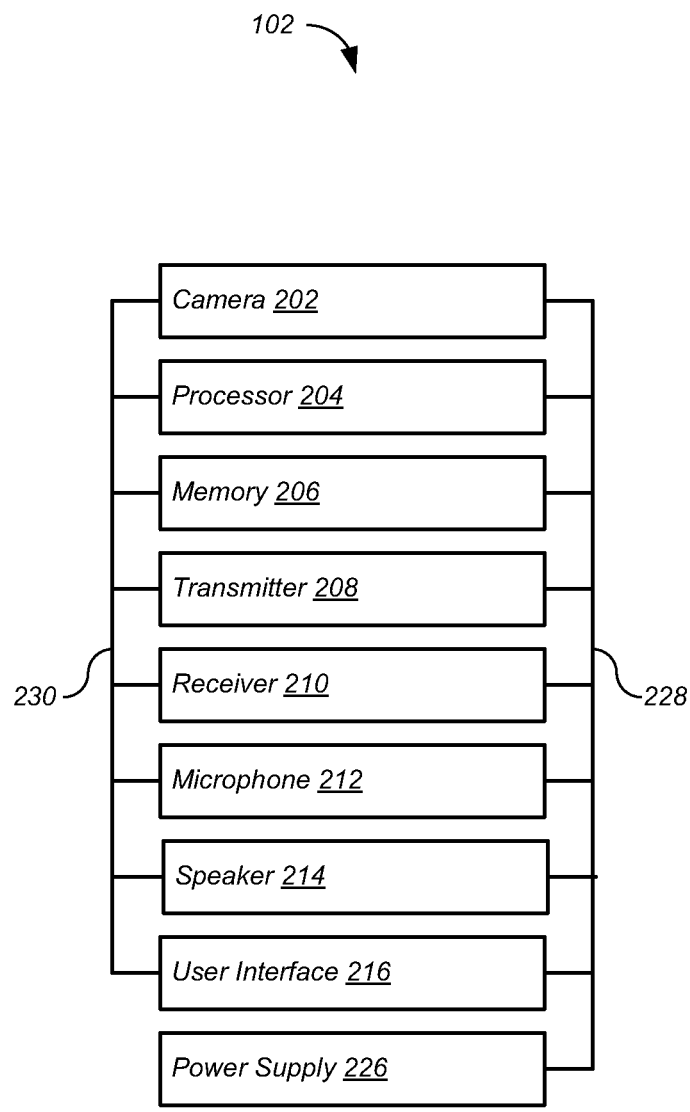
FIG. 2 shows elements of the video source of FIG. 1 according to one embodiment.

FIG. 2 shows elements of the video source 102 of FIG. 1 according to one embodiment. Although in the described embodiment elements of the video source 102 are presented in one arrangement, other embodiments may feature other arrangements. For example, elements of the video source 102 may be implemented in hardware, software, or combinations thereof. As another example, various elements of the video source 102 may be implemented as one or more digital signal processors.

Referring to FIG. 2, the video source 102 may include one or more each of a camera 202, a processor 204, a memory 206, a transmitter 208, a receiver 210, a microphone 212, a speaker 214, one or more user interface 216, and a power supply 226. The video source 102 may include other elements as well. The elements of the video source 102 may receive power from the power supply 226 over one or more power rails 228. Various elements of the video source 102 may be implemented as one or more integrated circuits. The processor 204 may execute applications stored in the memory 206. The processor 204 may include digital signal processors, analog-to-digital converters, digital-to-analog converters, and the like. The processor 204 may communicate with other elements of the video source 102 over one or more communication busses 230.

Figure 3:
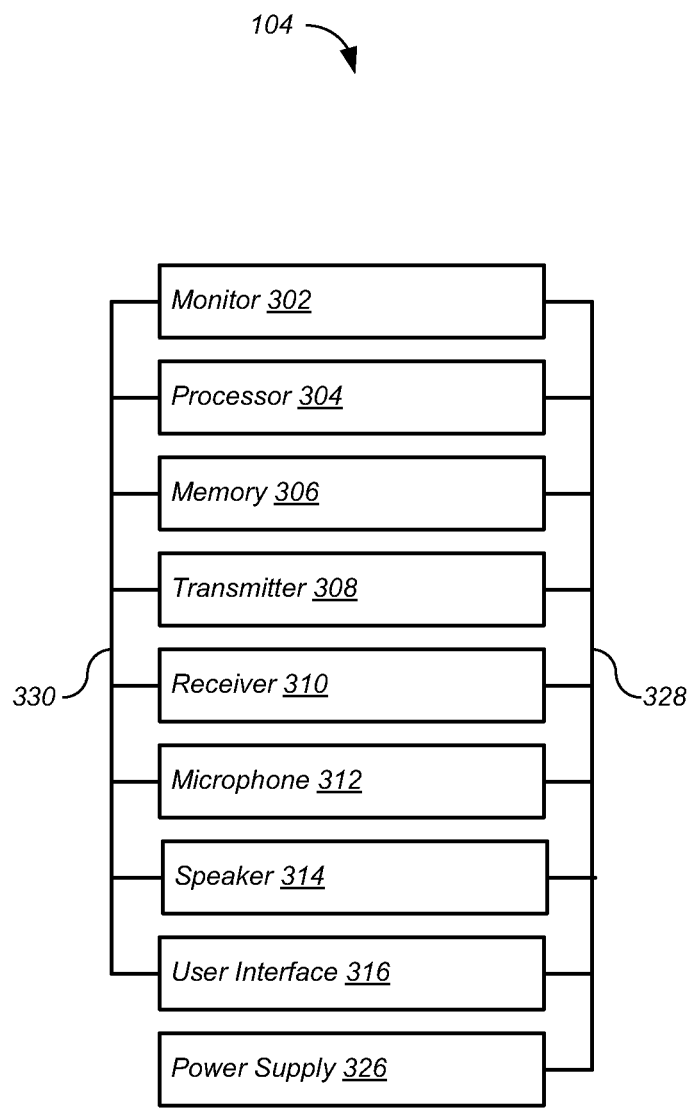
FIG. 3 shows elements of the local display device of FIG. 1 according to one embodiment.

FIG. 3 shows elements of the local display device 104 of FIG. 1 according to one embodiment. Although in the described embodiment elements of the local display device 104 are presented in one arrangement, other embodiments may feature other arrangements. For example, elements of the local display device 104 may be implemented in hardware, software, or combinations thereof. As another example, various elements of the local display device 104 may be implemented as one or more digital signal processors.

Referring to FIG. 3, the local display device 104 may include one or more each of a display screen or monitor 302, processor 304, a memory 306, a transmitter 308, a receiver 310, a microphone 312, a speaker 314, a user interface 316, and a power supply 326. The local display device 104 may include other elements as well. The elements of the local display device 104 may receive power from the power supply 326 over one or more power rails 328. Various elements of the local display device 104 may be implemented as one or more integrated circuits. The processor 304 may execute applications stored in the memory 306. The processor 304 may include digital signal processors, analog-to-digital converters, digital-to-analog converters, and the like. The processor 304 may communicate with other elements of the local display device 104 over one or more communication busses 330. The user interface 316 may include buttons, a keyboard or mouse, or a touchscreen or the like integrated with the monitor 302.

Figure 4:
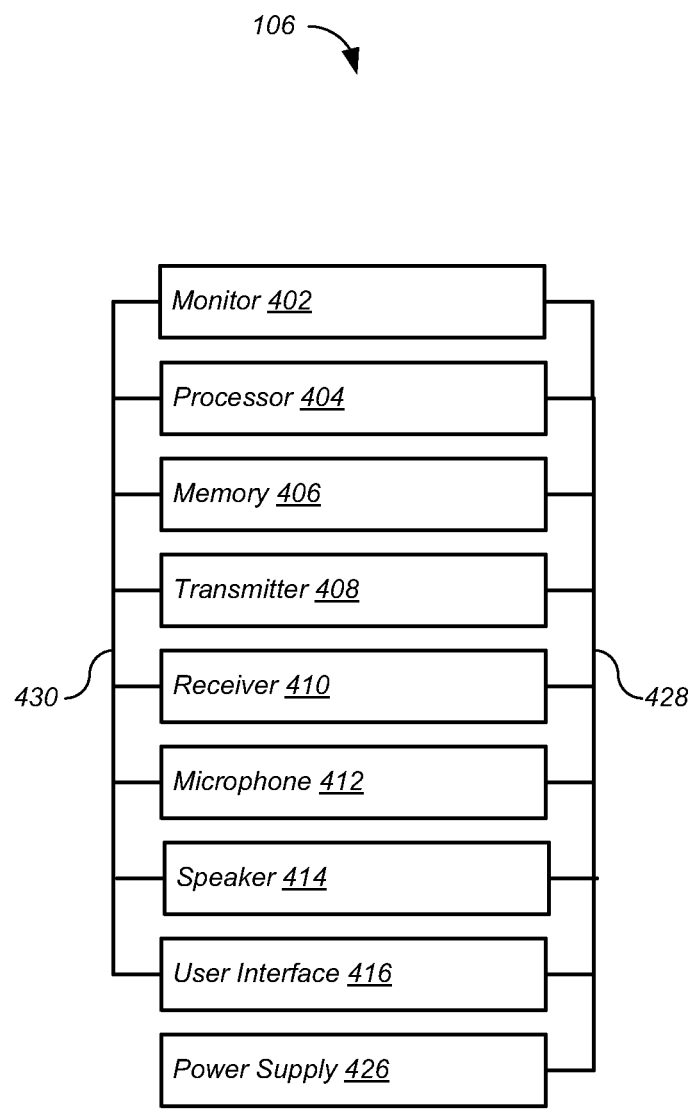
FIG. 4 shows elements of the remote display device of FIG. 1 according to one embodiment.

FIG. 4 shows elements of the remote display device 106 of FIG. 1 according to one embodiment. Although in the described embodiment elements of the remote display device 106 are presented in one arrangement, other embodiments may feature other arrangements. For example, elements of the remote display device 106 may be implemented in hardware, software, or combinations thereof. As another example, various elements of the remote display device 106 may be implemented as one or more digital signal processors.

Referring to FIG. 4, the remote display device 106 may include one or more each of a display screen or monitor 402, processor 404, a memory 406, a transmitter 408, a receiver 410, a microphone 412, a speaker 414, a user interface 416, and a power supply 426. The remote display device 106 may include other elements as well. The elements of the remote display device 106 may receive power from the power supply 426 over one or more power rails 428. Various elements of the remote display device 106 may be implemented as one or more integrated circuits. The processor 404 may execute applications stored in the memory 406. The processor 404 may include digital signal processors, analog-to-digital converters, digital-to-analog converters, and the like. The processor 404 may communicate with other elements of the remote display device 106 over one or more communication busses 430. The user interface 416 may include a buttons, a keyboard or mouse, or, or a touchscreen or the like integrated with the monitor 402.

If the video source 102 and local display device 104 are integrated into one device, for example a tablet computer as mentioned previously, the components and resources described with respect to FIGS. 2 and 3 will be shared as one of ordinary skill in the art would understand.

Figure 5:
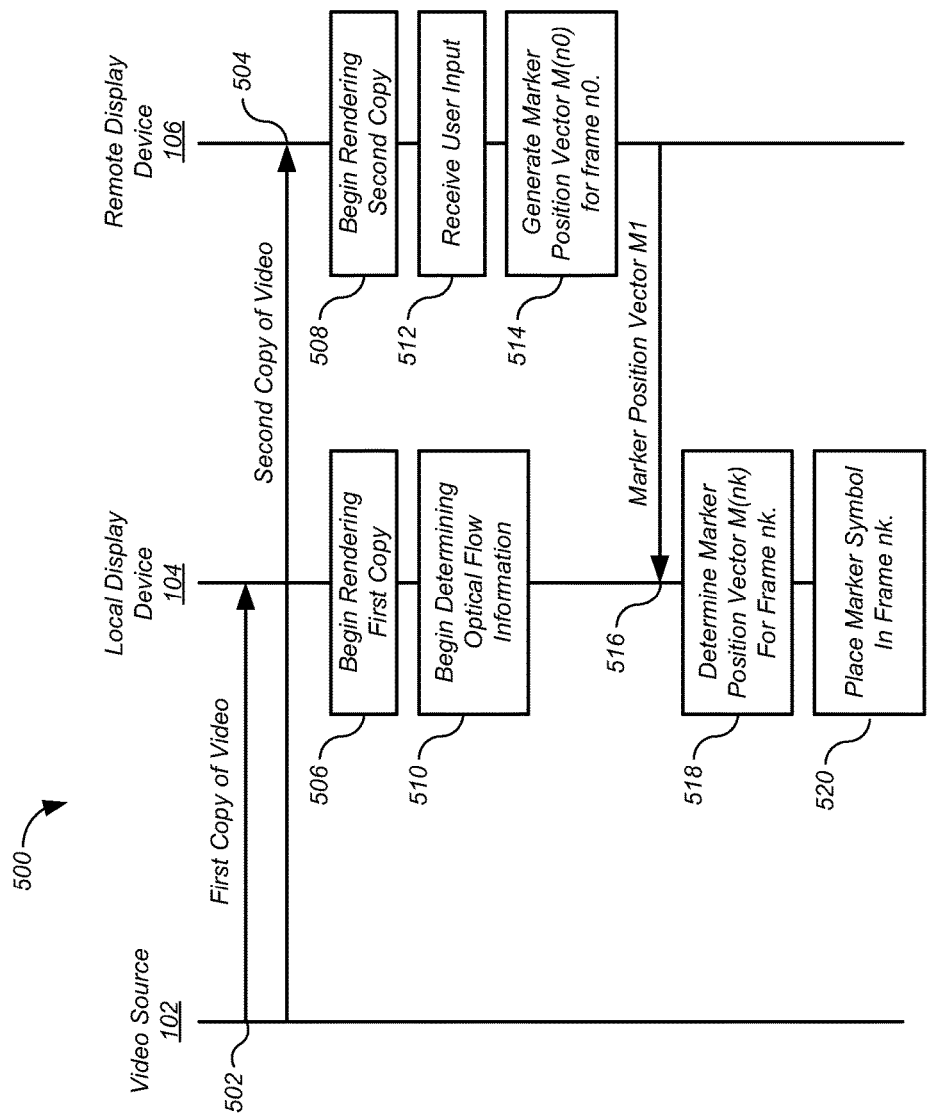
FIG. 5 shows a process for the video collaboration system of FIGS. 1 through 4 according to one embodiment.

FIG. 5 shows a process 500 for the video collaboration system 100 of FIGS. 1 through 4 according to one embodiment. Although in the described embodiments the elements of process 500 are presented in one arrangement, other embodiments may feature other arrangements. For example, in various embodiments, some or all of the elements of process 500 can be executed in a different order, concurrently, and the like. Also some elements of process 500 may not be performed, and may not be executed immediately after each other. In addition, some or all of the elements of process 500 can be performed automatically, that is, without human intervention.

Referring to FIGS. 5, at 502 and 504, the video source 102 may simultaneously stream two copies of a video. At 502, the transmitter 208 of video source 102 may transmit a first copy of the video over the communications channel 108, and the receiver 310 of local display device 104 may receive the first copy of the video. At 504, the transmitter 208 of video source 102 may transmit a second copy of the video over the communications channel 110, and the receiver 410 of remote display device 106 may receive the second copy of the video. At 506, the local display device 104 may begin rendering the first copy of the video on the monitor 302. At 508, the remote display device 106 may begin rendering the second copy of the video on the monitor 402.

At 510, the processor 204 of local display device 104 may begin determining optical flow information for the video based on the first copy of the video. Optical flow information may be represented as a vector quantity V(x, y, n) that describes the apparent velocity of movement of an image feature at spatial location (x, y) in frame number n, in units of pixels per frame. Computing optical flow is a standard image processing operation, which is implemented in libraries such as the open source computer vision library OpenCV. The process is described in the lecture notes posted by David Stavens of Stanford's Artificial Intelligence Lab: Computing Optical Flow.

In essence, the process consists of identifying one or more trackable features in a video frame and recording their positions, then finding the same features in a subsequent frame and computing the differences in their positions. A trackable feature is a feature for which the image brightness or color changes abruptly in both the x and y directions.

Figure 6:
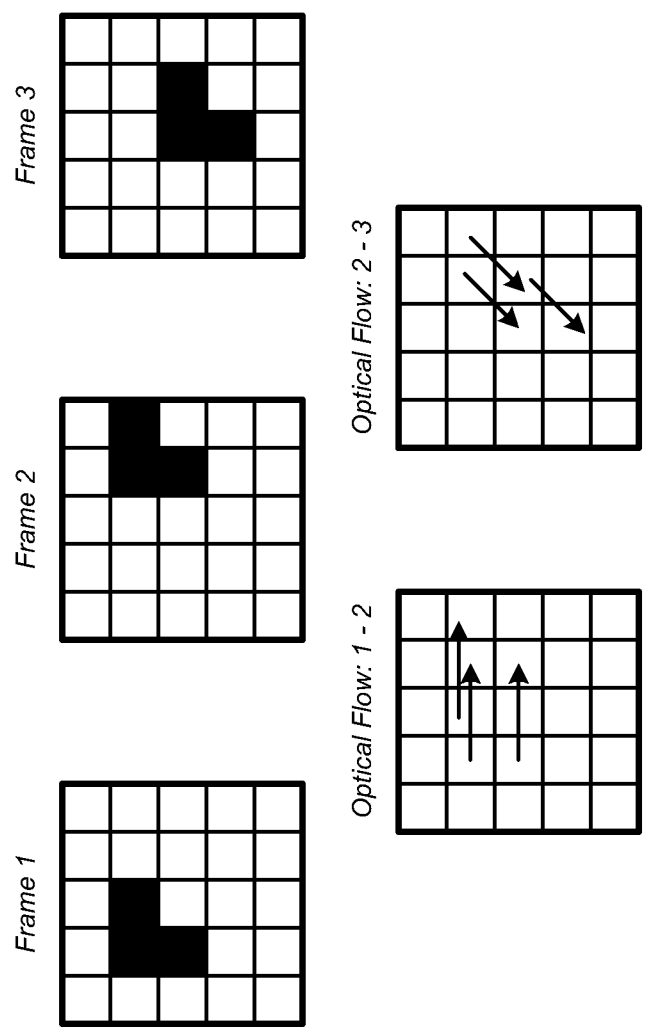
FIG. 6 illustrates the determination of optical flow information.

FIG. 6 illustrates the determination of optical flow information for three pixels, representing a trackable feature, in a frame of 25 pixels. FIG. 6 shows a sequence of three frames and the two corresponding optical flow matrices. The first optical flow matrix represents the movement of the group of pixels from frame 1 to frame 2, and illustrates this movement with vectors showing a movement of two pixels spaces to the right. The second optical flow matrix represents the movement of the pixels from frame 2 to frame 3, and illustrates this movement with vectors showing a movement of one pixel space diagonally down and to the right.

The local display device 104 may store optical flow information for the last N seconds in the memory 206, where N is greater than the maximum expected total latency Tv2−Tv1+Td2. This ensures that optical flow information is available for frames marked by a user of remote display device 106 despite the latencies involved.

At 512, the user interface 416 of the remote display device 106 may receive a user input for a first frame n0 of the video. The user input marks an object of interest in the video. For example, the user may mark an object by circling the object with his finger on a touchscreen rendering the video. At 514, the processor 504 may generate a first marker position vector M(n0) based on the user input. At 516, remote display device 106 may transmit the first marker position vector M(n0) for the frame n0 of the video to the local display device 104 over the communication channel 112. In particular, the transmitter 408 of the remote display device 106 may transmit the vector M(n0) and the receiver 310 of the local display device 104 may receive the vector M(n0).

By the time the vector M(n0) arrives at the local display device 104, the first copy of the video is k frames past frame n0 due to the latencies of the communications channels 108, 110, 112. That is, the frame nk being rendered at local display device 104 follows frame n0 by k frames where k>0. At 518, the processor 304 of local display device 104 may determine the marker position vector M(nk) for frame nk of the video based on the original marker position vector M(n0), the optical flow information, and the latencies Tv2, Tv1, Td2. In some embodiments, the processor 304 may determine the latencies Tv2, Tv1, Td2. At 520, the processor 304 of local display device 104 may place a marker symbol in frame nk of the first copy of the video according to the corresponding marker position vector M(nk) prior to the user interface 316 rendering frame nk of the first copy of the video. The local display device 104 repeats this process for subsequent frames of the first copy of the video. The marker symbol may take any shape, for example such as a circle, square or the like.

Figure 7:
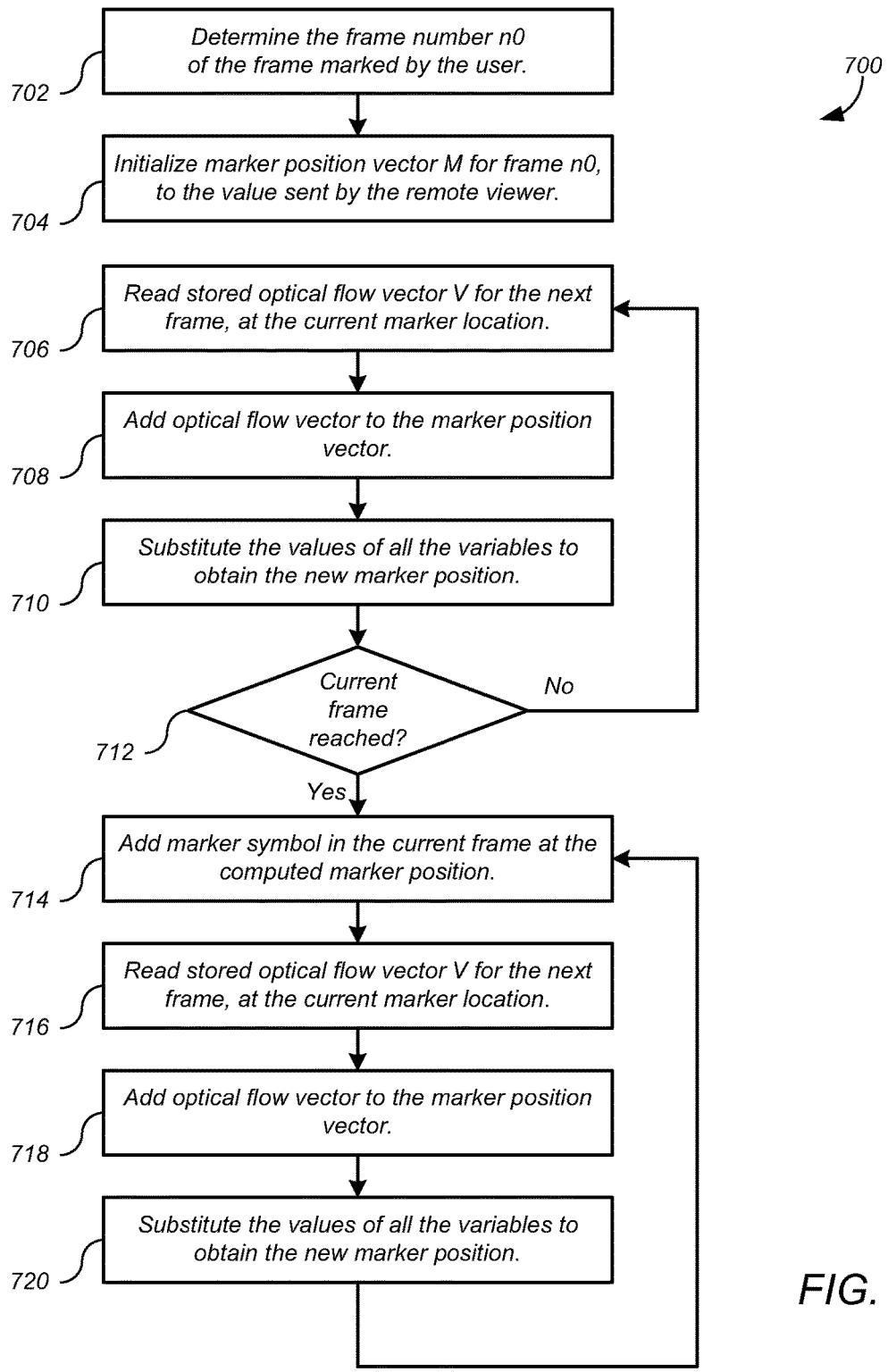
FIG. 7 shows a process for the local display device of FIGS. 1 and 3 for generating marker position vectors M and adding corresponding marker symbols to the video according to one embodiment.

FIG. 7 shows a process 700 for the local display device 104 of FIGS. 1 and 3 for generating marker position vectors M and adding corresponding marker symbols according to one embodiment. Although in the described embodiments the elements of process 700 are presented in one arrangement, other embodiments may feature other arrangements. For example, in various embodiments, some or all of the elements of process 700 can be executed in a different order, concurrently, and the like. Also some elements of process 700 may not be performed, and may not be executed immediately after each other. In addition, some or all of the elements of process 700 can be performed automatically, that is, without human intervention.

Referring to FIG. 7, at 702, the processor 304 of the local display device 104 may determine the frame number n0 of the frame marked by the user of remote display device 106 based on the original marker position vector M(n0). At 704, the processor 304 may initialize the new marker position vector M for frame n0 to the value sent by the remote viewer:

$$M(n0)=(x0, y0) \quad (1)$$

At 706, the processor 304 may read the stored optical flow vector V for the next frame, at the current marker location, from the memory 306:

$$V(x0, y0, n0+1)=(\Delta x, \Delta y) \quad (2)$$

where the scalar values of the x and y components of the stored optical flow vector V are $\Delta x$ and $\Delta y$ pixels per frame, respectively.

At 708, the processor 304 may add the optical flow vector to the original marker position vector M(n0) to estimate the marker position in the next frame:

$$M(n0+1)=M(n0)+V(x0, y0, nm+1) \quad (3)$$

At 710, the processor 304 may substitute the values of all the variables to obtain the new marker position:

$$M(n0+1)=((x0+\Delta x), (y0+\Delta y)) \quad (4)$$

At 712, the processor 304 may repeat the read, add and substitute operations, at 706, 708 and 710, to calculate a marker positions for each successive frame, from the marker position in the previous frame, until the frame currently being rendered is reached. The result is the current marker position.

At 714, the processor 304 may add a marker symbol in the current video frame at the computed marker position.

The processor 304 may repeat the read, add and substitute operations, at 714, 716, 718 and 720, in real time, for each new video frame to track the marked object until it goes out of frame or the user of the remote display device 106, or the local display device 104, deletes the marker.

In an alternate embodiment, instead of calculating and storing an optical flow matrix for each video frame that includes an optical flow vector for every pixel in the frame, a sparse optical flow matrix may be calculated and stored. The sparse optical flow matrix may contains optical flow vectors for only the N best trackable features in each frame, where N is an integer. This variation reduces the amount of memory required for optical flow matrix storage, and may reduce the processor workload if there is an efficient algorithm for identifying and ranking the best trackable features.

The implementation that has been described may be modified to enable more than one video marker to be displayed simultaneously.

In the implementation that has been described, optical flow matrices are calculated and stored for every video frame, regardless of whether there is an active video marker. When the remote viewer places a marker in a previous frame, all the optical flow data that are required to calculate the current marker position are already available. An alternative implementation reduces total processor workload by not calculating optical flow matrices when there are no active video markers. Raw video frames, instead of optical flow matrices, are stored in the local display's memory 306. When a video marker is added, the local display's processor 304 calculates optical flow matrices for all video frames between the frame in which the marker was placed and the current frame. The processor 304 must be capable of a high peak workload to make this alternative implementation viable.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. Accordingly, other implementations are within the scope of the following claims.

What is claimed is:

1. A first display device comprising:
   a receiver configured to receive, from a video source over a first communications channel having a first communications channel latency, a first copy of a streaming video, wherein the video source simultaneously streams a second copy of the streaming video to a second display device over a second communications channel having a second communications channel latency, wherein the second communications channel latency is greater than the first communications channel latency;

a processor configured to determine an optical flow information for the streaming video based on the first copy of the streaming video; and a monitor configured to render the first copy of the streaming video;

wherein the receiver is further configured to receive, from the second display device over a third communications channel having a third communications channel latency, a first marker position vector for a first frame of the streaming video;

wherein the processor is further configured to determine a second marker position vector for a second frame of the streaming video based on the first marker position vector, the optical flow information, the first communications channel latency, the second communications channel latency and the third communications channel latency, wherein the second frame follows the first frame in the streaming video; and wherein the processor is further configured to place a marker symbol in the second frame of the first copy of the streaming video according to the second marker position vector prior to the monitor rendering the second frame of the first copy of the streaming video.

2. The first display device of claim 1, wherein:

the processor is further configured to determine a third marker position vector for a third frame of the streaming video based on the first marker position vector, the optical flow information, the first communications channel latency, the second communications channel latency and the third communications channel latency; and wherein the processor is further configured to place the marker symbol in the third frame in the first copy of the streaming video according to the third marker position vector.

3. The first display device of claim 1, further comprising:

the video source, wherein the video source comprises a camera configured to capture the streaming video, and wherein the streaming video is transmitted in real time.

4. The first display device of claim 1, further comprising:

the video source, wherein the video source comprises a memory, and wherein the streaming video is stored in the memory.

5. The first display device of claim 1, wherein:

the processor is further configured to determine the first communications channel latency, the second communications channel latency and the third communications channel latency.

6. A method for a first display device, the method comprising:

receiving, from a video source over a first communications channel having a first communications channel latency, a first copy of a streaming video, wherein the video source simultaneously streams a second copy of the streaming video to a second display device over a second communications channel having a second communications channel latency, wherein the second communications channel latency is greater than the first communications channel latency;

determining an optical flow information for the streaming video based on the first copy of the streaming video; and receiving, from the second display device over a third communications channel having a third communications channel latency, a first marker position vector for a first frame of the streaming video;

determining a second marker position vector for a second frame of the streaming video based on the first marker position vector, the optical flow information, the first communications channel latency, the second communications channel latency and the third communications channel latency, wherein the second frame follows the first frame in the streaming video;

rendering the first copy of the streaming video; and placing a marker symbol in the second frame in the first copy of the streaming video according to the second marker position vector prior to rendering the second frame of the first copy of the streaming video.

7. The method of claim 6, further comprising:

determining a third marker position vector for a third frame of the streaming video based on the first marker position vector, the optical flow information, the first communications channel latency, the second communications channel latency and the third communications channel latency; and placing the marker symbol in the third frame in the first copy of the streaming video according to the third marker position vector prior to rendering the third frame of the first copy of the streaming video.

8. The method of claim 6, further comprising:

capturing the streaming video, wherein the streaming video is transmitted in real time.

9. The method of claim 6, wherein receiving the first copy of the streaming video comprises:

retrieving the streaming video from a memory.

10. The method of claim 6, further comprising:

determining the first communications channel latency, the second communications channel latency and the third communications channel latency.

11. The method of claim 6, further comprising:

rendering the streaming video on a monitor of the second display device;

receiving a user input on the second display device; and generating the first marker position vector based on the user input.

12. The method of claim 11, further comprising:

transmitting the first marker position vector, over the second communications channel, to the first display device.

13. One or more non-transitory computer-readable storage media having computer-executable instructions stored thereon which, when executed by one or more computers, cause the one or more computers to perform operations comprising:

receiving at a first display device, from a video source over a first communications channel having a first communications channel latency, a first copy of a streaming video, wherein the video source simultaneously streams a second copy of the streaming video to a second display device over a second communications channel having a second communications channel latency, wherein the second communications channel latency is greater than the first communications channel latency;

determining an optical flow information for the streaming video based on the first copy of the streaming video; and receiving, from the second display device over a third communications channel having a third communications channel latency, a first marker position vector for a first frame of the streaming video;

determining at the first display device a second marker position vector for a second frame of the streaming video based on the first marker position vector, the optical flow information, the first communications channel latency, the second communications channel latency and the third communications channel latency, wherein the second frame follows the first frame in the streaming video;

causing rendering of the first copy of the streaming video at the first display device; and placing a marker symbol in the second frame in the first copy of the streaming video according to the second marker position vector prior to rendering the second frame of the first copy of the streaming video at the first display device.

14. The one or more non-transitory computer-readable storage media of claim 13, wherein the operations further comprise:

determining a third marker position vector for a third frame of the streaming video based on the first marker position vector, the optical flow information, the first communications channel latency, the second communications channel latency and the third communications channel latency; and placing the marker symbol in the third frame in the first copy of the streaming video according to the third marker position vector prior to rendering the third frame of the first copy of the streaming video.

15. The one or more non-transitory computer-readable storage media of claim 13, wherein the operations further comprise:

causing capturing of the streaming video, wherein the streaming video is transmitted in real time.

16. The one or more non-transitory computer-readable storage media of claim 13, wherein receiving the first copy of the streaming video comprises:

retrieving the streaming video from a memory.

17. The one or more non-transitory computer-readable storage media of claim 13, wherein the operations further comprise:

determining the first communications channel latency, the second communications channel latency and the third communications channel latency.

18. The one or more non-transitory computer-readable storage media of claim 13, wherein the operations further comprise:

causing rendering of the streaming video on a monitor of the second display device;

receiving a user input on the second display device; and generating the first marker position vector based on the user input.

19. The one or more non-transitory computer-readable storage media of claim 18, wherein the operations further comprise:

causing transmission of the first marker position vector, over the second communications channel, to the first display device.

* * * * *